Figure 1:
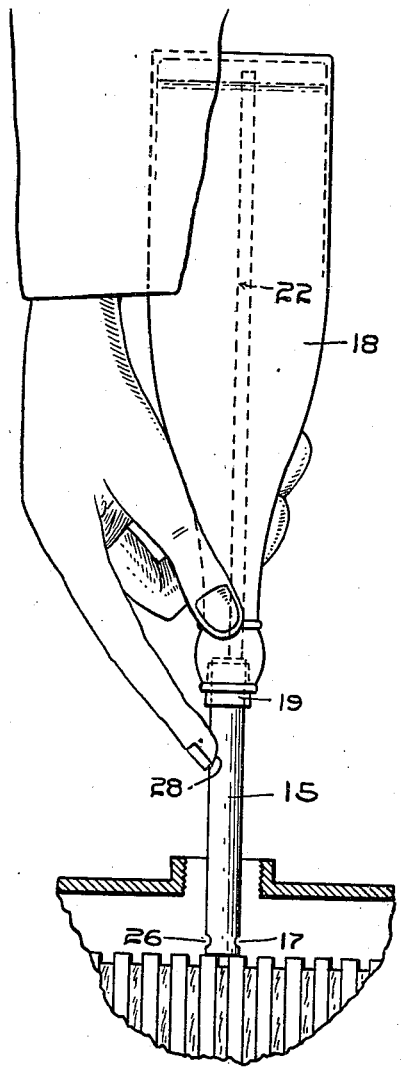

G. H. HICKMAN.
WATER REPLENISHING DEVICE FOR STORAGE BATTERIES.
APPLICATION FILED MAR. 1, 1920.

1,415,559.

Patented May 9, 1922.
2 SHEETS—SHEET 1.

INVENTOR:
George H. Hickman,
By Frank W. Woerner,
ATTORNEY.

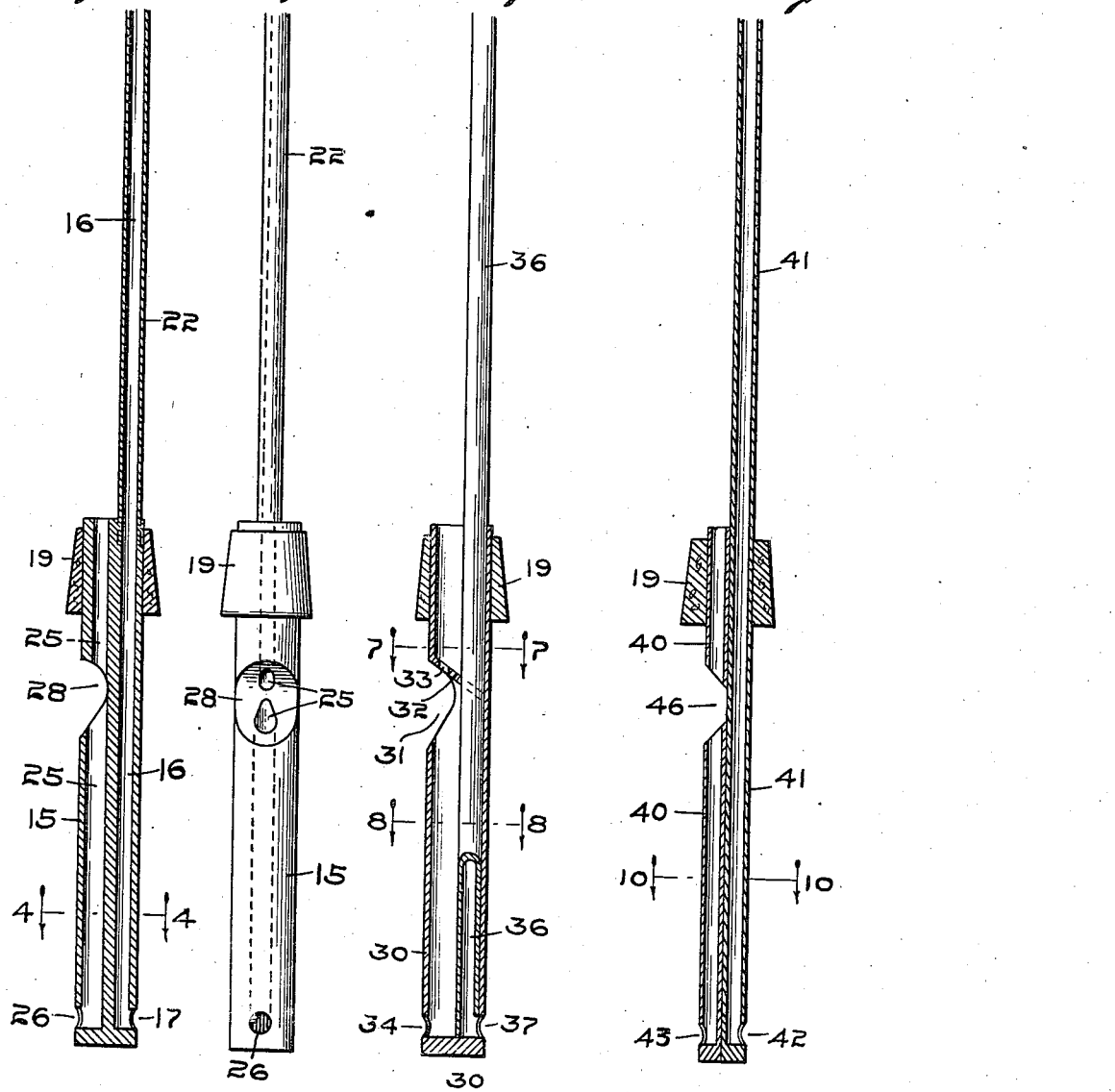

UNITED STATES PATENT OFFICE.

GEORGE H. HICKMAN, OF JAMESTOWN, INDIANA.

WATER-REPLENISHING DEVICE FOR STORAGE BATTERIES.

1,415,559.   Specification of Letters Patent.   Patented May 9, 1922.

Application filed March 1, 1920. Serial No. 362,569.

*To all whom it may concern:*

Be it known that I, GEORGE H. HICKMAN, a citizen of the United States, residing at Jamestown, in the county of Boone and State of Indiana, have invented certain new and useful Improvements in Water-Replenishing Devices for Storage Batteries, of which the following is a specification.

In order to maintain proper chemical reaction in electric storage batteries of the wet cell type, it is necessary to keep the plates of the cells submerged beneath the surface of the water, and in order to maintain proper supervision as to the time of replenishing the water in the cells, it is desirable that the plates be kept submerged a uniform depth beneath the surface of the water. As the several plates constituting a cell of a wet storage battery are enclosed in a suitable cell-box having an aperture in its top through which water may be introduced to the cell chamber, and as the distance between the top edge of the plates and the cell-box varies in the construction of different manufacturers, it is rather difficult to introduce a desired amount of water into each cell to submerge the plates a uniform depth. This being true there is liability of some of the cells being supplied with an overcharge of water while other cells may receive an undercharge or insufficient amount of water.

The present invention relates to a device by which the desired amount of water can be introduced into each cell-box so as to submerge the plates a uniform distance below the surface of the water.

One of the objects of the invention consists in the provision of a device of the above character in which the plates of the cell of a wet storage electric battery may be easily, quickly and accurately submerged a uniform depth below the surface of the water.

A further object of the invention consists in the provision of a water replenishing device by which the desired amount can be added to each cell of an electric storage battery in the dark, and preventing the external surface of the battery from being saturated with water.

A still further object of the invention consists in the provision of a device of the above character wherein when sufficient water has been introduced into a cell of an electric storage battery, to submerge the plates a determined depth, the water is automatically cut off thereby preventing the introduction of additional water into the cell.

A still further object of the invention consists in the provision of a device of the above character which is simple in construction, efficient in operation, and which will be cheap to manufacture.

I accomplish the above objects of the invention, and such others as may appear from a perusal of the following description and claims, by means of the construction illustrated in the accompanying drawings, forming a part hereof, in which—

Figure 2:
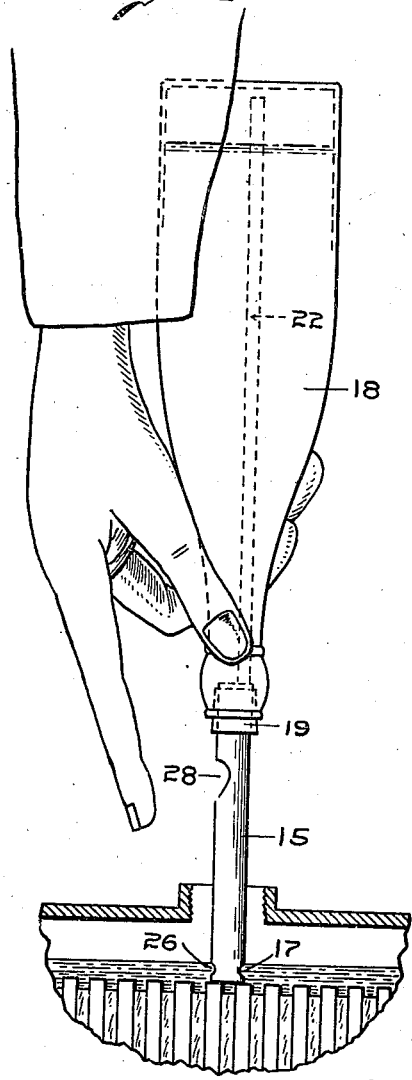

Figure 1 is a side elevation, showing my invention when first introduced into a cell-box of an electric storage battery. Fig. 2 is a view similar to Figure 1, except that the view shows when the device has introduced sufficient water to submerge the plates a determined distance below the surface of the water. Fig. 3 is a central longitudinal sectional view through the device. Fig. 4 is a cross section on the line 4—4 in Fig. 3. Fig. 5 is a front elevation of the construction shown in Fig. 3. Fig. 6 is a central longitudinal sectional view through a modified construction of the water replenishing device. Fig. 7 is a cross section on the line 7—7 in Fig. 6. Fig. 8 is a cross section on the line 8—8 in Fig. 6. Fig. 9 is a central longitudinal sectional view through a second modification of the water replenishing device. Fig. 10 is a cross section on the line 10—10 in Fig. 9.

The water replenishing device for electric storage batteries contemplates primarily a cylindrically shaped member 15 which is provided at one side of its axis with a longitudinally disposed inlet air passageway 16, which passageway has an opening to the atmosphere near the lower end of member 15 through an orifice 17. Member 15 is of sufficient length to extend into the opening of a storage battery and contact the plates, and the upper end of said member is provided with a suitable cork 19 adapted to fit the inlet opening through the neck of a bottle 18 or similar receptacle for the storage of water which is to be added to the cells of the battery. In order to prevent the water from passing out through the air inlet opening 16, when the bottle is inverted, passageway 16 is extended above and beyond the end of member 15 through the medium of a hollow tube 22, which tube terminates a short distance from the bottom of bottle 18, as clearly shown in Figs. 1 and 2. Member 15 is further provided with a comparatively small size longitudinally extending water outlet passageway 25 which extends parallel with the air inlet passageway 16, and the passageway 25 communicates with the atmosphere near the lower end of member 15 through an orifice 26. Member 15 intermediate its ends is provided with a laterally disposed notch 28 which is of sufficient depth to intersect the water outlet passageway 25, the purpose of this notch is to enable the operator to discontinue both the flow of water through passageway 25 and air into the bottle through passageway 16, by the use of his finger as is clearly exemplified in Figs. 1 and 2 of the drawings. When the device is inverted and introduced through an opening leading into a cell of a storage battery, as shown in Fig. 1, the operator's fore finger occupies notch 28 which prevents the premature discharge of water from bottle 18. After the operator has placed the device in proper position he removes his finger from notch 28 which establishes a circulation through passageways 16 and 25 and the discharge of water through orifice 26 into the cell of the battery. When the surface of the water within the cell has attained a height to submerge air inlet orifice 17 further inlet of air into bottle 18 is discontinued, by removing the atmospheric pressure from the surface of the water within bottle 18, and further discharge of water into the cell of the battery is prevented. The device is then moved and introduced into the next cell, when the operation is repeated, as heretofore described.

In order to remove the liability of the water discharging through the upper portion of passageway 25 from seeking an outlet through notch 28, and discharging exteriorly of member 15 at that point, the diameter of the lower end or section of said passageway 25 is considerably enlarged so as to readily receive and carry downwardly the water discharged from its upper and more narrow portion. This enlargement of the lower section of water passageway 25 is not absolutely necessary, but is my preferred way of construction, for reasons heretofore mentioned.

In Fig. 6 of the drawings I have shown a modified construction of the device which contemplates a hollow cylindrical member 30 which is open at its upper end and closed at the lower end. Member 30 has a notch 31 cut therein, and above this notch I divide the hollow portion of said tube by means of a division wall 32 which contains a comparatively small size water outlet opening 33 through which the water discharges into the hollow portion of the lower end of member 30, the water passing into the cell of the battery through an orifice 34, similar to orifice 26 in Fig. 3. In this construction air is conveyed to the interior of bottle 18 through a tube 36 having an opening at its lower end which registers with an air inlet opening 37, similar to opening 17 in Fig 3.

Pipe 36 is held rigidly in position against the internal side wall of member 30, by any suitable means. The construction shown in Fig. 6 is as efficient in operation as the construction shown in Fig. 3, and is more economical to manufacture.

The construction shown in Fig. 9 is as efficient and more simple and more economical to manufacture than either of the constructions shown in Figs. 3 and 6. The last mentioned construction shown in Fig. 9 contemplates the use of two parallel tubes 40 and 41 of different lengths which are rigidly secured together to form a unit structure. Tube 41 which conveys the air to the interior of bottle 18 is closed at its lower end, the air passing into said tube through a lateral orifice 42, which is similar to orifice 17 or 37. Tube 40 for conveying the water from bottle 18 is closed at its bottom, the water discharging therefrom through a laterally disposed orifice 43, similar to orifice 26 or 34. In the construction shown in Fig. 9 tube 40 is preferably formed of two alined sections which are separated a sufficient distance apart to provide an intervening space or notch 46, which performs a function similar to the notches 28 and 32.

Having thus fully described my said invention, what I desire to secure by Letters Patent, is—

1. A water replenishing device for electric storage batteries comprising a primary cylinder having a pair of longitudinally disposed passageways of different lengths, the shorter passageway being of comparatively small size and having an opening connecting with the atmosphere intermediate its ends, said opening adapted to be closed by the finger of the operator.

2. A water replenishing device for electric storage batteries comprising a pair of parallel hollow tubes of different lengths, the shorter tube being of comparatively small size and having an orifice intermediate its ends communicating with the atmosphere, said opening adapted to be uncovered or sealed by the operator's finger for starting or stopping the flow of water through the shorter tube, and a source of water communicating with the inlet end of the passageway leading through the shorter tube.

3. A water replenishing device for electric storage batteries comprising means provided with a pair of longitudinally extending passageways terminating at one end in laterally disposed orifices, one of said passageways being of less length and of less diameter than the other, the shorter passageway having communication with the atmosphere through a centrally located lateral orifice which is adapted to be uncovered or closed by the operator's finger, and means forming a liquid-holding chamber arranged around one end of the passageway extending through the shorter tube.

In witness whereof, I have hereunto set my hand and seal at Jamestown, Indiana, this 20th day of February, A. D. one thousand nine hundred and twenty.

GEORGE H. HICKMAN. [L. S.]